(12) United States Patent
Hummelshøj

(10) Patent No.: US 10,100,867 B2
(45) Date of Patent: Oct. 16, 2018

(54) LOCK WASHER

(71) Applicant: EXPANITE TECHNOLOGY A/S, Hillerød (DK)

(72) Inventor: Thomas Strabo Hummelshøj, Frederiksberg (DK)

(73) Assignee: EXPANITE TECHNOLOGY A/S, Hillerød (DK)

( * ) Notice: Subject to any disclaimer, the term of this patent is extended or adjusted under 35 U.S.C. 154(b) by 0 days.

(21) Appl. No.: 15/310,916

(22) PCT Filed: May 15, 2015

(86) PCT No.: PCT/EP2015/060736
§ 371 (c)(1),
(2) Date: Nov. 14, 2016

(87) PCT Pub. No.: WO2015/173380
PCT Pub. Date: Nov. 19, 2015

(65) Prior Publication Data
US 2017/0082134 A1    Mar. 23, 2017

(30) Foreign Application Priority Data
May 15, 2014    (EP) .................................... 14168476

(51) Int. Cl.
*F16B 39/10*    (2006.01)
*C23C 8/26*    (2006.01)
(Continued)

(52) U.S. Cl.
CPC .............. *F16B 39/103* (2013.01); *C21D 1/06* (2013.01); *C21D 6/004* (2013.01); *C21D 9/40* (2013.01);
(Continued)

(58) Field of Classification Search
CPC ... C21D 1/06; C21D 1/08; C21D 1/09; C21D 1/10; C21D 8/0257; C21D 8/0457;
(Continued)

(56) References Cited

U.S. PATENT DOCUMENTS 5,503,688 A     4/1996  Arnaud et al.
6,770,152 B1 *  8/2004  Okita ........................ C21D 6/04
                                                          148/319

(Continued)

FOREIGN PATENT DOCUMENTS

DE    10 2004 039 926 A1    2/2006
EP         0 652 300 A1     5/1995
(Continued)

OTHER PUBLICATIONS

"Glossary of Metallurgical and Metalworking Terms," Metals Handbook, ASM Handbooks Online, ASM International, 2002, pp. 1, 63, 74, 257.*
(Continued)

*Primary Examiner* — Keith Walker
*Assistant Examiner* — Vanessa T. Luk
(74) *Attorney, Agent, or Firm* — Buchanan Ingersoll & Rooney P.C.

(57) ABSTRACT

A profiled element suitable for repeated deformation and relaxation, which profiled element is made from a case hardened stainless steel including at least 9% chromium and up to 6% nickel which profiled element has a material thickness in the range of from 0.2 mm to 3 mm and a nitrogen martensitic case with a case depth in the range of from 10 μm to 50 μm and a surface hardness of up to 750 HV0.05 and to a method of case hardening a workpiece made from a stainless steel including at least 9% chromium and up to 5% nickel, which workplace has a material thickness in the range of from 0.2 mm to 3 mm. The profiled (Continued)

element may be a fixing element for fixing a bearing element and a fastening element against each other, and the method is suited in the manufacture of the fixing element.

13 Claims, 7 Drawing Sheets

(51) Int. Cl.
*C21D 1/06* (2006.01)
*C21D 6/00* (2006.01)
*C21D 9/40* (2006.01)
*C22C 38/00* (2006.01)
*C22C 38/40* (2006.01)

(52) U.S. Cl.
CPC ............ *C22C 38/001* (2013.01); *C22C 38/40* (2013.01); *C23C 8/26* (2013.01)

(58) Field of Classification Search
CPC ... C21D 8/1255; C21D 2211/008; C23C 8/24; C23C 8/26; C23C 8/30; C23C 8/32; C23C 8/36; C23C 8/38; C23C 8/48; C23C 8/50; C23C 8/54; C23C 8/56; C23C 8/74; C23C 8/76; C23C 14/586
See application file for complete search history.

(56) References Cited

U.S. PATENT DOCUMENTS

| | | | |
|---|---|---|---|
| 8,104,577 B1* | 1/2012 | Reed .................... | E06C 5/02 |
| | | | 182/127 |
| 2006/0070685 A1* | 4/2006 | Grell .................... | B21D 53/10 |
| | | | 148/211 |
| 2010/0175269 A1 | 7/2010 | Boerner et al. | |
| 2011/0041959 A1* | 2/2011 | Mizuno .................... | C21D 1/06 |
| | | | 148/318 |
| 2012/0101531 A1 | 4/2012 | Barth | |
| 2013/0243544 A1* | 9/2013 | Delcher ................ | F16B 39/282 |
| | | | 411/154 |
| 2014/0048180 A1 | 2/2014 | Christiansen et al. | |

FOREIGN PATENT DOCUMENTS

| | | | | |
|---|---|---|---|---|
| JP | 2002-194504 A | | 7/2002 | |
| WO | WO 2008/092640 A1 | | 8/2008 | |
| WO | WO 2008/124239 A1 | | 10/2008 | |
| WO | WO 2011161387 A1 | * | 12/2011 | ............. F16B 39/24 |
| WO | WO 2012/146254 A1 | | 11/2012 | |
| WO | WO 2013/159781 A1 | | 10/2013 | |

OTHER PUBLICATIONS

"Glossary of Metallurgical and Metalworking Terms," Metals Handbook, ASM Handbooks Online, ASM International, 2002, pp. 1, 184, 185, 257.*
BSI Standards Publication (DIN, EN, ASTM), The British Standards Institution, 2014, 73 pages total.*
International Search Report (PCT/ISA/210) dated Jul. 28, 2015, by the European Patent Office as the International Searching Authority for International Application No. PCT/EP2015/060736.
International Preliminary Report on Patentability (PCT/IPEA/409) dated Aug. 5, 2016, by the European Patent Office as the International Searching Authority for International Application No. PCT/EP2015/060736.
Letter to ISA concerning earlier search (PCT Direct) date May 15, 2015.
Bashchenko et al., "Alloying Iron and its Alloys With Nitrogen Under High Pressure", Nauk SSSR, Metally, No. 4, 1985, pp. 173-178.
Edenhofer et al., "Ionic Technologies Inc.", Jun. 10, 2008, 10 pages.
Georgiev et al., "Nitrogen Solubility in 1.4306 and 1.4435 Austenitic Steels", Journal of Materials Science and Technology, vol. 4, No. 4, 1996, pp. 28-32.
Irretier et al., "SolNit®-Einsatzhärten mit Stickstoff von rostbeständigen Stählen", 2006, pp. 491-495.

* cited by examiner

LOCK WASHER

FIELD OF THE INVENTION

The present invention relates to a profiled element, e.g. a fixing element, made from a case hardened stainless steel. The fixing element is for fixing a bearing element and a fastening element against each other when the assembly of the fastening element and the bearing element is exposed to mechanical force. The profiled element has improved reusability and corrosion properties over comparable elements of the prior art. The invention further relates to a method of case hardening a workpiece made from a stainless steel, e.g. to provide a profiled element of the invention.

PRIOR ART

Stainless steels are used in numerous structural applications, where the wide range of compositions and treatments of stainless steels may provide material properties desired for a given application. However, due to the complexity of stainless steel there are still specific areas where the material properties can be modified to better fit specific purposes. In particular, the field of case hardening of stainless steels is not fully elaborated.

Georgiev et al. (Journal of Materials Science and Technology, Vol. 4, 1996, No. 4, pp. 28) and Bashchenko et al. (Izvestiya Akademii Nauk SSSR. Metally, no. 4, 1985, pp. 173-178) demonstrate that nitrogen and carbon can be dissolved in stainless steel at temperatures above 1050° C. under equilibrium conditions. It is shown that at such temperatures the problem with permeation of the passive layer of stainless steel can be bypassed, since this becomes unstable at these high temperatures. Moreover, carbides and nitrides are not formed at these high temperatures. To avoid precipitation of carbides/nitrides during cooling a fast cooling rate is required. For martensitic stainless steel types a significant hardening of the surface can take place by fast cooling.

EP 0652300 discloses a thermal treatment process to form an austenitic surface and near surface layer having dissolved nitrogen in a stainless steel component that nearly has its final shape. The process includes enriching the component with nitrogen at a temperature from 1000° C. to 1200° C. in a nitrogen-containing gas atmosphere and subsequently cooling down the component at such a rate that nitride separation is avoided.

WO 2008/124239 suggests a hybrid carburisation process with intermediate rapid quench, according to which a carbon hardened surface in a metal workpiece can be formed without forming carbide precipitates by subjecting the workpiece to both high temperature carburisation and low temperature carburisation, wherein immediately after high-temperature carburisation, the workpiece is rapidly quenched to a temperature below which carbide precipitates form.

WO 2012/146254 discloses a method for solution hardening of a cold deformed workpiece of a passive metal. The method comprises a first step in which nitrogen is dissolved in the workpiece at a temperature higher than the solubility temperature for nitride formation and lower than the melting point of the workpiece, and a subsequent second step, wherein nitrogen and/or carbon are dissolved at a temperature where substantially no formation of carbides and/or nitrides occurs. The method may also comprise a quick cooling from the first to the second temperature.

WO 2013/159781 is based on the technology of WO 2012/146254 and further discloses that improved corrosion protection can be obtained by cooling the workpiece in an inert gas not containing nitrogen after the high temperature dissolution of nitrogen.

WO 2008/092640 provides a dining or serving cutlery made of ferritic stainless steel with a martensitic boundary layer. The boundary layer is formed by a heat treatment with nitriding and subsequent cooling and is essentially martensitic. The surface hardness (HV3) of the boundary layer must be greater by 30 to 300% than the lowest hardness of the core measured according to HV3. WO 2008/092640 does not, however, disclose how to obtain this martensitic boundary layer.

Edenhofer et al. (2008, Ionic Technologies Inc, http://ionic-tech.com/wp-content/uploads/solutionnitriding.pdf) and Irretier and Rink (2006, Gaswärme International, 7: 491-495) describe a technology known as the SolNit process. The SolNit process addresses the problem that carburising and nitriding of highly alloyed stainless steels in the normal temperature region between 500 and 1000° C. is not possible without considerable loss of corrosion resistance. The SolNit process allows formation of much deeper cases and achieves the highest nitrogen surface concentration possible by inserting nitrogen at temperatures above 1050° C. followed by quenching.

A specific example of a high temperature insertion of nitrogen into stainless steel is disclosed in DE 10 2004 039926, where steel parts are treated to insert nitrogen to a level of 0.3 to 0.6% to a depth between 0.3 and 1.5 mm. The process is said to provide a higher corrosion resistance.

US 2012/101531 relates to a biocompatible material made of a rust-resistant, alloyed stainless steel which is configured with at least one martensitic surface layer which is formed by a heat treatment with nitrogen case hardening and subsequent cooling. The heat treatment may be at a temperature between 1000 and 1200° C. to a thickness of typically 80 to 300 μm.

JP 2002 194504 provides a chromium stainless steel foil having spring properties. The steel may be treated at a temperature of 1050° C. for 5 to 90 s, before quenching, followed by an ageing heat treatment at 100-600° C. The process of JP 2002 194504 is employed with materials of about 100 μm thickness, and therefore the material of JP 2002 194504 will be fully nitrided. Thus, the material will have a uniform profile throughout its thickness, which may not be optimal for certain applications.

As shown by the prior art documents several methods exist to harden a stainless steel. However, the same hardening methods may not be equally relevant to all uses of hardened stainless steel. For example, fixing elements, e.g. lockwashers, treated in a prior art method can only be reused about three times before the metal loses its properties, which are needed for the lockwasher. The same observation is relevant for other profiled elements where repeated deformation and relaxation are important. It is an aim of the present invention to provide an improved profiled element, e.g. a fixing element, of greater reusability than provided by the prior art. It is also an aim to provide a profiled element, e.g. a fixing element, of greater corrosion resisting properties. It is a further aim to provide a method for hardening a workpiece, e.g. in order to provide the improved profiled element, e.g. the fixing element. It is also an aim of the invention to provide an improved profiled element that is cheaper to produce.

DISCLOSURE OF THE INVENTION

The present invention relates to a profiled element suitable for repeated deformation and relaxation, which profiled element is made from a case hardened stainless steel comprising at least 9% chromium and up to 5% nickel, which profiled element has a material thickness in the range of from 0.2 mm to 3 mm and a nitrogen martensitic case with a case depth in the range of from 10 µm to 50 µm and a surface hardness of up to 750 HV0.05 as measured according to the DIN EN ISO 6507 standard. The profiled element is suitable for repeated deformation and relaxation. In general, the profiled element will have a relaxed state when it is not exposed to external forces, but in use it will be exposed to external force deforming the profiled element. Upon removal of the external force the profiled element will return to its relaxed state allowing that it can be reused. The profiled element of the invention can be reused at least 5 times, preferably at least 10 times or more. In the context of the invention a "profiled element" is generally considered to be an element which has been punched from a sheet of the stainless steel. The profiled element may be any profiled element intended for use under conditions where it is exposed to repeated deformation and relaxation. The relaxed state occurs when the profiled element is not exposed to external force, and the relaxed state may also be referred to as a state where external forces are released or removed, and the terms "relaxation", and "release" or "removal" of external force may be used interchangeably.

The invention is generally described as a "profiled element", but in a specific embodiment the invention relates to a "fixing element". It is noted that any advantage observed for a fixing element is also relevant for a profiled element, and vice versa.

In a preferred embodiment the profiled element is a fixing element, and in the context of the invention a "fixing element" is an element designed for insertion between a bearing element and a fastening element allowing that the fastening element and the bearing element are fixed against each other when the assembly of the fastening element and the bearing element is exposed to mechanical force, such as vibration, impact, impingement, rotation etc. In general, when a fixing element is inserted between a fastening element and a bearing element the fixing element will be exposed to deformation from the fastening element and the bearing element, and the material properties of the fixing element allow that the fastening element and the bearing element are fixed against each other. The fastening element may for example be a screw or the like having fastening means, e.g. an external helical thread, and the bearing element may for example be a nut or an object with a surface having complementary fastening means to the fastening element, e.g. an internal helical thread.

The present inventor observed that when the process of WO 2012/146254 is applied to a workpiece of an austenitic stainless steel, e.g. AISI 316, to produce a fixing element, a fixing element having a core hardness of 300-400 HV to a depth exceeding 1 mm and a surface hardness of >1100 HV to a depth of 30-35 µm can be provided. Such a fixing element prepared using the process of WO 2012/146254 can, however, typically be reused in only three cycles of deformation and release from deformation between a fastening element and a bearing element.

The present inventor has now surprisingly found that when a stainless steel element as defined above, e.g. a ferritic stainless steel, is provided with a nitrogen martensitic case with a case depth in the range of from 10 µm to 50 µm, e.g. from 10 µm to 25 µm, in particular with a nitrogen content in the range of 0.05% to 0.5%, e.g. 0.2% to 0.4%, and having a surface hardness of up to 750 HV, e.g. up to 680 HV, the profiled element, e.g. a fixing element, obtains superior properties with respect to reusability allowing that e.g. a fixing element retains its fixing effect after more than 5, e.g. more than 10, cycles of deformation and release from deformation between a fastening element and a bearing element. Similar observations are made for other types of profiled elements, e.g. a spring, a clip for holding paper, or a hair pin. Thus, a profiled element, e.g. a fixing element, of increased reusability is provided. Without being bound by theory the present inventor believes that the combination of a ductile core of a stainless steel having a material thickness in the range of 0.2 mm to 3 mm and having the nitrogen martensitic case of 10 µm to 50 µm, e.g. 10 µm to 25 µm, provides the suitability for repeated deformation and relaxation. Preferred material thicknesses are in the range of 0.5 mm to 1.5 mm. In the context of the invention the term "nitrogen martensitic case" means a martensite stabilised with nitrogen, and the nitrogen martensitic case does not contain more than 5% retained austenite. It is preferred that the nitrogen martensitic case does not contain any retained austenite. In contrast, when the surface hardness of the case exceeded 750 HV, or when the case depth exceeded 50 µm the fixing element became too brittle so that deformation between the fastening element and the bearing element destroyed the fixing element or at least prevented its reuse. It is noted that in general, the lower the material thickness of the profiled element the lower the thickness of the nitrogen martensitic case to obtain the effect. Likewise, the thicker the material, the thicker the nitrogen martensitic case to obtain the effect. However, for elements of a material thickness below 0.2 mm or above 3 mm the present inventors have found that the effect of suitability for repeated deformation and relaxation could not be obtained. Elements with material thicknesses below 0.2 mm became too brittle when provided with a nitrogen martensitic case of up to 10 µm case depth, whereas elements with material thicknesses above 3 mm became too soft when provided with a nitrogen martensitic case of higher than 50 µm case depth. Thus, the effect was observed for profiled elements having a material thickness in the range of from 0.2 mm to 3 mm when provided with a nitrogen martensitic case with a case depth in the range of from 10 µm to 50 µm and a surface hardness of up to 750 HV0.05, in particular with a case depth in the range of from 10 µm to 25 µm and a surface hardness of up to 680 HV0.05.

The reusability is relevant for any embodiment of the profiled element of the invention. However, it is particularly relevant for fixing elements having or being of a three-dimensional structure, such as when the fixing element has a structured surface or when the shape of the fixing element deviates from a two-dimensional structure, e.g. when the fixing element has a frustoconical or helical shape. The nitrogen martensitic case will generally have a hardness of at least 620 HV. Thus, a preferred range of hardness is from 620 HV to 680 HV, and a more preferred range of hardness is from 620 HV to 650 HV. The best results were observed for profiled elements, e.g. fixing elements, having a nitrogen martensitic case depth in the range of from 10 µm to 20 µm. Exemplary combinations of case depth and surface hardness obtained for an AISI 430 stainless steel and the corresponding reusabilities for fixing elements are summarised in Table 1.

TABLE 1

Exemplary case depth and surface hardness

| Case depth (μm) | Surface hardness (HV) | Reusability (times) |
| --- | --- | --- |
| 10 | 622 | >10 |
| 13 | — | >6 |
| 21 | 670 | >5 |
| 20 | 630 | >10 |
| 50 | 670 | >5 |
| 143 | 579 | 0 |
| 173 | 620 | 0 |
| 180 | 635 | 0 |
| 248 | 510 | 0 |
| 265 | 627 | 0 |
| 321 | — | 0 |
| 338 | 670 | 0 |

In addition to increased reusability the profiled element, e.g. fixing element, of the invention also has improved corrosion resistance over profiled elements of the prior art.

The profiled element, e.g. the fixing element, of the invention can be prepared from any stainless steel having a low content of nickel, i.e. up to 5%, such as up to 4%, up to 3%, up to 2%, up to 1%, or no nickel. Since nickel is an expensive alloying element employing a stainless steel of low nickel content is advantageous due to the reduced cost of manufacture. This is particularly relevant for nickel free stainless steels. A preferred stainless steel is a ferritic stainless steel, e.g. AISI 430.

In another aspect the invention relates to a method of case hardening a workpiece made from a stainless steel comprising at least 9% chromium and up to 5% nickel, which workpiece has a material thickness in the range of from 0.2 mm to 3 mm, the method comprising the steps of:
  providing a workpiece punched from a sheet of the stainless steel,
  optionally embossing the workpiece,
  in an atmosphere of a nitrogen containing gas dissolving at least nitrogen in the workpiece at a temperature $T_{high}$, which is higher than the solubility temperature for nitride and lower than the melting point of the stainless steel, wherein dissolution of nitrogen at the temperature $T_{high}$ is performed to obtain a diffusion depth in the range of 10 μm to 50 μm with a content of nitrogen in the range of 0.05% to 0.5%,
  cooling the workpiece after the dissolution step at temperature $T_{high}$ to a temperature $T_{low}$ which is lower than the temperature at which nitrides form in the stainless steel, to provide a nitrogen martensitic case, wherein the cooling is effected within 60 seconds.

Any workpiece of the stainless steel may be treated according to the invention. In particular, the method provides a stainless steel suitable for repeated deformation and relaxation, which allows high reusability of a fixing element or for other application where this suitability is important. The method is especially suited for case hardening a workpiece to become a profiled element of the invention. The fact that the workpiece has been punched from a sheet of stainless steel is especially relevant for elements intended for repeated deformation and relaxation, where these properties allow the repeated deformation and relaxation.

The method of the invention comprises dissolving nitrogen in the workpiece at a temperature higher than the solubility temperature for nitride, and further the method comprises cooling the workpiece to a temperature which is lower than the temperature at which nitrides form in the stainless steel. Both these temperature limits are known to the skilled person, e.g. from a phase diagram. Stainless steels may also comprise carbon, and when the workpiece contains carbon it is noted that the temperature limits, i.e. $T_{high}$ and $T_{low}$, are also above and below, respectively, the temperatures where carbides may form in the steel. The method may comprise, but preferably does not, dissolving carbon, e.g. at $T_{high}$, in the workpiece.

The method of the invention requires that nitrogen is dissolved in the stainless steel to a depth of 10 μm to 50 μm, e.g. 10 μm to 25 μm. In the context of the invention nitrogen is dissolved to a specific depth when it can be measured at that depth. The content of nitrogen in the hardened stainless steel, e.g. in the nitrogen martensitic case, is in the range of 0.05% to 0.5%, e.g. 0.2% to 0.4%. In particular, when nitrogen is dissolved to a concentration of 0.3% nitrogen martensite without detrimental nitrides and with sufficient hardness will form in the stainless steel upon quenching the stainless steel after dissolution of nitrogen at $T_{high}$. In contrast, when the nitrogen content is above 0.5% there is an increased risk of formation of nitrides and moreover the stainless steel will become too brittle. Thus, when nitrogen is dissolved to a depth of 10 μm to 50 μm in a stainless steel treated in the method a case of nitrogen martensite of a case depth in the range of from 10 μm to 50 μm is provided. It is preferred that the nitrogen content of the nitrogen martensitic case is in the range of 0.05% to 0.5, e.g. 0.2% to 0.4%, and that the nitrogen content at a greater depth, e.g. at a depth above 50 μm, is below 0.05%. In particular, if the element contains nitrogen at or above 0.05% at a depth above 50 μm the element will be too brittle and it will not be suitable for repeated deformation and relaxation. It is preferred that the nitrogen content at depths above 50 μm is 0%.

Control of the dissolution depth is well known to the skilled person and parameters of relevance for controlling the dissolution depth are pressure of the nitrogen containing gas ($P_{nitrogen}$) temperature (i.e. $T_{high}$) and dissolution time. The parameter values are generally dependent on the specific type of stainless steel. In general, values for these parameters may be chosen freely as long a dissolution depth from 10 μm to 50 μm, e.g. from 10 μm to 25 μm, and a content of nitrogen in the hardened stainless steel, e.g. in the nitrogen martensitic case, is in the range of 0.05% to 0.5%, e.g. 0.2% to 0.4%, are obtained. Exemplary combinations of these parameters and the corresponding case depths obtained for an AISI 430 stainless steel are shown in Table 2. It is preferred than the nitrogen containing gas is $N_2$, e.g. essentially pure $N_2$, such as grade 5.0 or better, although other gases may also be present. If other gasses are present it is preferred than these are gasses that are inert with respect to dissolution in the stainless steel. Exemplary inert gasses are argon or any other noble gas, or hydrogen ($H_2$). The nitrogen pressure ($P_{nitrogen}$) may be expressed as the partial pressure of nitrogen in a gas containing other compounds or the absolute pressure of nitrogen when no other gasses are present.

TABLE 2

Case depths obtained

| $P_{nitrogen}$ (mbar) | $T_{high}$ (° C.) | Time (min) | Case depth (μm) |
| --- | --- | --- | --- |
| 100 | 1100 | 30 | 10 |
| 100 | 1150 | 60 | 10 |
| 200 | 1150 | 30 | 15 |
| 300 | 1100 | 30 | 19 |
| 100 | 1100 | 60 | 34 |

TABLE 2-continued

Case depths obtained

| $P_{nitrogen}$ (mbar) | $T_{high}$ (° C.) | Time (min) | Case depth (μm) |
|---|---|---|---|
| 300 | 1150 | 60 | 50 |
| 300 | 1100 | 120 | 143 |
| 500 | 1100 | 60 | 173 |
| 500 | 1150 | 60 | 180 |
| 1200 | 1100 | 60 | 248 |
| 500 | 1150 | 120 | 265 |
| 900 | 1150 | 60 | 321 |
| 1500 | 1150 | 60 | 338 |

$P_{nitrogen}$ is generally an important parameter in determining the dissolution depth. It is preferred that $P_{nitrogen}$ is at or below 350 mbar, in particular at or below 200 mbar; preferred values of $P_{nitrogen}$ are in the range of from 50 mbar to 350 mbar, e.g. 100 mbar to 300 mbar, such as about 100 mbar, 150 mbar, 200 mbar, or 300 mbar. The dissolution time will typically be up to about 120 minutes, although at this dissolution time, $P_{nitrogen}$ should generally not be higher than 200 mbar, e.g. below or at 150 mbar or below or at 100 mbar, in order not to exceed the maximum dissolution depth.

High treatment times, e.g. above 90 minutes, at high temperature may lead to an increase in grain size in the stainless steel, e.g. AISI 430, which is considered undesirable for the present invention. At dissolution times of up to 90 minutes, e.g. dissolution times in the range of from 10 minutes to 90 minutes, in particular at dissolution times of 90 minutes or lower, especially 60 minutes or lower, increase in grain size is considered negligible for the present invention, and dissolution times of 60 minutes or less are preferred, e.g. 60 minutes, 50 minutes, 40 minutes 30 minutes, 20 minutes, 10 minutes. It is preferred that the dissolution time is at or below 60 minutes, in particular when $P_{nitrogen}$ is in the range of 100 mbar to 300 mbar, e.g. 100 mbar or 200 mbar. Certain values of $P_{nitrogen}$ allow that the dissolution time is 30 minutes or less. For example, a $P_{nitrogen}$ of 100 mbar, 200 mbar or 300 mbar may be combined with a dissolution time of 30 minutes to obtain case depths in the range of 10 μm to 20 μm.

The temperature $T_{high}$ may generally be in the range of from 1000° C. to 1300° C., e.g. in the range of from 1050° C. to 1250° C. At a temperature $T_{high}$ in the range of 1075° C. to 1125° C., e.g. 1090° C. to 1110° C., such as about 1100° C., the solubility of nitrogen in the steel is considered higher than when the temperature $T_{high}$ is in the range of from 1125° C. to 1175° C., so that nitrogen can be dissolved faster, e.g. to a greater depth in a shorter time, at a $T_{high}$ in the range of 1075° C. to 1125° C. than at temperatures above 1125° C. Thus, in one embodiment $T_{high}$ is in the range of 1075° C. to 1125° C., e.g. 1100° C., and the dissolution time is in the range of up to 30 minutes, e.g. 30 minutes, such as from 10 minutes to 30 minutes. For these ranges of $T_{high}$ and dissolution time the pressure may be in the range of from 100 mbar to 300 mbar.

For dissolution temperatures in the range of from 1125° C. to 1175° C., e.g. from 1140° C. to 1160° C., it is generally observed that the corrosion resistance is improved over the corrosion resistance for dissolution at temperatures in the range 1075° C. to 1125° C. and also than what is typically seen for case hardened stainless steels. Without being bound by theory the present inventor believes that this effect is caused by the lower nitrogen solubility in this temperature range, e.g. compared to the range of 1075° C. to 1125° C. In an embodiment $T_{high}$ is thus in the range of from 1125° C. to 1175° C.

Since the major constituent of stainless steels is iron, the stated ranges of the parameters $T_{high}$, dissolution time and $P_{nitrogen}$ are considered relevant also for other types of stainless steel than AISI 430.

Certain combinations of $P_{nitrogen}$, $T_{high}$, and dissolution time are particularly advantageous, and preferred combinations of the parameter values are given in Table 3.

TABLE 3 preferred combinations of parameter values

| $P_{nitrogen}$ (mbar) | $T_{high}$ (° C.) | Time (min) |
|---|---|---|
| 100 to 300 | 1050 to 1175 | 30 to 60 |
| 100 to 300 | 1075 to 1125 | 30 to 60 |
| 100 to 300 | 1125 to 1175 | 30 to 60 |
| 100 | 1150 | 60 |
| 200 | 1100 | 60 |
| 200 | 1100 | 90 |
| 150 | 1150 | 60 |
| 200 | 1150 | 30 |
| 300 | 1150 | 60 |
| 100 | 1100 | 30 |
| 300 | 1100 | 30 |

Compared to certain methods of the prior art, the method of the invention advantageously does not require a low temperature dissolution, e.g. at a temperature in the range of 300° C. to 500° C., of nitrogen or carbon. A low temperature dissolution of nitrogen or carbon is typically time consuming, e.g. requiring several hours (for example 10 to 30 hours), and the method of the present invention is much faster than when low temperature is required. In general, low temperature dissolution steps may provide a surface layer known as "expanded austenite" or "expanded martensite". The fixing element of the invention does not need a case of expanded austenite or expanded martensite.

The method comprises cooling the material after the dissolution at temperature $T_{high}$ to a temperature $T_{low}$ which is lower than the temperature at which nitrides, or carbides and nitrides, form in the stainless steel. This temperature is well-known to the skilled person and it will generally be below 500° C. The cooling step, e.g. in a nitrogen-free inert gas, is effected within 60 seconds, but preferably cooling is performed in a nitrogen-free inert gas in less than 30 seconds, such as in less than 10 seconds. Thus, when the workpiece is cooled to the temperature $T_{low}$ sensitisation is avoided, i.e. precipitation of nitrides and also carbides is avoided.

The high temperature treatment at $T_{high}$, e.g. in the range of 1075° C. to 1175° C., causes the metal structure to change to austenite, and it is believed that the nitrogen martensitic layer forms upon cooling of the workpiece. The present inventors have now surprisingly found that when nitrogen is dissolved to a content of nitrogen in the range of 0.05% to 0.5%, e.g. 0.2% to 0.4%, and to a diffusion depth in the range of 10 μm to 50 μm, e.g. 10 μm to 25 μm, this fact combined with the low nickel content, i.e. up to 5%, such as up to 4%, up to 3%, up to 2%, up to 1%, or no nickel, will ensure a sufficient transformation, e.g. at least 95% transformation or complete transformation, to martensite. In methods of the prior art it has generally been necessary to include a cryogenic treatment, e.g. cooling the workpiece to a temperature below 0° C., such as in the range of −40° C. to −200° C., e.g. using dry ice or liquid nitrogen, to ensure complete transformation to martensite. In the method of the invention a cryogenic treatment is advantageously not required, and it is preferred that the method does not comprise a cryogenic treatment. If the treated workpiece contains more than 5% retained austenite phase after cooling e.g. if the workpiece has a nickel content above 5% or a nitrogen content above 0.5%, the effect of invention with respect to reusability will not be obtained. The present inventor has surprisingly found that when the diffusion depth is below 300 μm coupled with a dissolved to a content of nitrogen in the range of 0.05% to 0.5% and a nickel content below 5%, e.g. 3%, quenching of the workpiece will result in formation of a nitrogen martensitic case comprising at least 95% martensitic phase. Thus, in another aspect the invention relates to a method of formation of a nitrogen martensitic case on a workpiece comprising the steps of providing a workpiece of a stainless steel having a nickel content of up to 5%, in an atmosphere of a nitrogen containing gas dissolving at least nitrogen in the workpiece at a temperature $T_{high}$, which is higher than the solubility temperature for nitride and lower than the melting point of the stainless steel, wherein dissolution of nitrogen at the temperature $T_{high}$ is performed to obtain a diffusion depth in the range of 10 μm to 300 μm with a content of nitrogen in the range of 0.05% to 0.5%, cooling the workpiece after the dissolution step at temperature $T_{high}$ to a temperature $T_{low}$ which is lower than the temperature at which nitrides form in the stainless steel, to provide a nitrogen martensitic case, wherein the cooling is effected within 60 seconds, which method does not comprise a cryogenic treatment. In this aspect of the invention the material thickness of the workpiece is of litter concern, and the material thickness may be in the range of 0.2 mm to 10 mm or more. All other features disclosed for the first method aspect of the invention are otherwise relevant for this second method aspect, and the features may be combined freely.

The cooling may be performed using any appropriate method, e.g. in a gas under high pressure, such as in the range of 4 and 20 bar, such 6 and 10 bar, such as at 7 bar or at 8 bar, or at 9 bar. The cooling may take place in a gas of the same composition as the gas used in the dissolution at $T_{high}$, or the cooling may take place in an inert gas not containing nitrogen, such as a noble gas, e.g. helium (He), neon (Ne), argon (Ar), krypton (Kr), xenon (Xe), or radon (Rn), or any mixture of these, with argon being particularly preferred. In another embodiment cooling takes place in argon at high pressure, e.g. in the range of 4 and 20 bar, such as in the range of 6 and 10 bar, such as at 7 bar or at 8 bar, or at 9 bar.

In a preferred embodiment the dissolution step is performed in a gas, such as a gas containing $N_2$, e.g. substantially pure $N_2$, such as grade 5.0 or better, without other gasses than unavoidable impurities, and the cooling step is also performed in a gas, which is an inert gas not containing nitrogen (a nitrogen-free inert gas) with argon being particularly preferred. In the context of the invention an "inert gas" is a gas that does not contain any substantial amount of molecules which interact with elements of the alloy; any inert gas not containing nitrogen is contemplated in the invention, or mixtures of gasses. When an inert gas is employed in the cooling step the workpiece treated in the method of the invention has a corrosion resistance, which is even superior to the corrosion resistance obtained using other cooling gases, or when the cooling step is performed using other methods. In particular, gasses containing nitrogen are believed to accelerate formation of nitrides when the cooling is performed in a gas containing nitrogen compared to cooling in an inert gas, so that a more robust and flexible method is provided with a cooling step using an inert gas. $P_{nitrogen}$ in the treatment at temperature $T_{high}$ influences the solubility of nitrogen, so that the higher $P_{nitrogen}$ in the treatment at temperature $T_{high}$ the more nitrogen is dissolved and the more pronounced is the effect of cooling in an inert gas not containing nitrogen.

Once the workpiece has been cooled to the temperature $T_{low}$ no further processing of the workpiece is required. $T_{low}$ is typically 500° C. or less. For example, no further machining steps are required, and it is observed that additional machining of a workpiece treated in the method may destroy the martensite case. Thus, the workpiece treated in the method may be a workpiece at its final shape or in its final form. Likewise, there is no need to anneal the workpiece after cooling to $T_{low}$, although in certain embodiments an annealing step may be performed after cooling to $T_{low}$. If an annealing step is included this will typically be performed by exposing the treated workpiece to a temperature, which is lower than $T_{low}$, i.e. the temperature at which carbides and/or nitrides form in the stainless steel, e.g. below 500° C., but at least 200° C. Annealing will normally take place in a gas, e.g. an inert gas with respect to dissolving additional components in the steel. The annealing step will normally last for at least one hour but longer times may also be needed. Annealing may, however, be accompanied with increasing grain sizes in the stainless steel, especially for AISI 430 steel, and it is preferred not to include an annealing step. In particular, when the dissolution step of the method of the invention is performed in the time range of up to 90 minutes, e.g. 60 minutes or 30 minutes, there is little risk of increasing the grain size.

In yet another aspect the invention relates to a workpiece obtainable in the method of case hardening a workpiece of the invention. The workpiece may be any workpiece that can benefit from the reusability properties of the stainless steel obtained in the method. In particular, the workpiece may have a nitrogen martensitic case depth in the range of from 10 μm to 50 μm, e.g. 10 μm to 25 μm, and a surface hardness of up to 750 HV, in particular a case depth in the range of from 10 μm to 20 μm combined with a surface hardness in the range of from 620 HV to 650 HV. The nitrogen martensitic case may have a nitrogen content in the range of 0.05% to 0.5%, e.g. 0.2% to 0.4%. It is preferred that the workpiece is a profiled element, e.g. a fixing element, according to the invention. Other workpieces of relevance are a spring, a clip for holding paper, notes, hair pins, etc.

When the profiled element is a fixing element, the fixing element may have any shape allowing it to be inserted between a bearing element and a fastening element. For example, the fixing element may take the form of a plate with a hole, e.g. the fixing element may be of annular shape. The fixing element may also have a frustoconical shape, or the fixing element may have a helical shape, e.g. a spring. Fixing elements are well known to the skilled person. In particular, the skilled person can readily select a type of fixing element to fulfil a specific purpose. A preferred type of fixing element is one commonly referred to as a "washer", "washer ring", "lockwasher", etc.

In a specific embodiment the profiled element is a fixing element, e.g. a lockwasher, having an annular or frustoconical shape. The fixing element, e.g. an annular or frustoconical fixing element, may be prepared by punching the workpiece from an appropriate sheet of stainless steel, e.g. with a sheet thickness in the range of from 0.5 mm to 3 mm or more, before subjecting the workpiece to the method of the invention in order to obtain the fixing element. The workpiece should have a thickness to ensure that the workpiece is not fully nitrided in the method, and therefore it is preferred that the minimum thickness of the workpiece is 0.2 mm. Likewise, the material thickness of the profiled element is at least 0.2 mm. If the workpiece is fully nitrided through its thickness, the resulting case hardened element will be brittle and not suitable for repeated deformation and relaxation. The properties relating to reusability will not be obtained and a fully nitrided profiled element will not be suitable for repeated deformation and relaxation. The punched workpiece may also be subjected to embossing. The material thickness of a profiled element of the invention, in particular an annular or frustoconical fixing element, is in the range of from about 0.2 mm to about 3 mm. The size of a fixing element, e.g. an annular fixing element or a frustoconical fixing element will typically in the range of from 3 mm to 50 mm. The size may be the diameter when the fixing element is round or has a round footprint. Other profiled elements will generally be of the same superficial size, e.g. with dimensions in the range of from 3 mm to 50 mm.

The profiled element, especially a fixing element which is punched from a sheet of stainless steel, may have a first engagement surface and a second engagement surface, where the first engagement surface faces a surface of the bearing element and the second engagement surface faces a surface of the fastening element, e.g. when the fixing element is compressed between the bearing element and the fastening element. Either engagement surface or both engagement surfaces of the fixing element may be structured, e.g. to have protrusions or the like. The structure of the surface of the fixing element may be provided by embossing a workpiece provided by punching from a sheet of stainless steel. Alternatively, the structure of the surface of the profiled element, e.g. a fixing element, may be provided directly in the punching step. The punched workpiece or the embossed workpiece may then be treated according to the method of the invention to provide the profiled element.

The structure, e.g. the protrusions, may have any shape, and the perpendicular dimensions, relative to the engagement surface of the profiled element, e.g. the fixing element, of protrusions on the engagement surface will typically be in the range of from about 100 µm to 1 mm or more. A structured engagement surface of a fixing element can enhance the fixing effect of the fixing element when it is compressed between a bearing element and a fastening element. For example, a structured engagement surface may comprise protrusions, such as teeth, ridges, projections or the like, that grip an opposing surface of the bearing element or the fastening element in order to increase the friction between the engagement surface of the fixing element and the respective opposite surface. When a profiled element, e.g. a fixing element, with a structured engagement surface, e.g. with protrusions, is compressed between a bearing element and a fastening element the protrusions will be deformed by the compression. However, the properties of the stainless steel, e.g. from the nitrogen martensitic case depth in the range of from 10 µm to 50 µm, e.g. 10 µm to 25 µm, combined with the surface hardness of up to 750 HV, e.g. a case depth in the range of from 10 µm to 20 µm combined with the surface hardness of in the range of 620 HV to 650 HV, obtained by treatment in the method of the invention, allows that the profiled element or fixing element may be reused since the structure of the protrusions is retained after more than 5, e.g. more than 10 cycles of deformation and release from deformation between a fastening element and a bearing element. The effect of suitability for repeated deformation and relaxation observed for the profiled element, e.g. the fixing element, is surprisingly relevant both on a "macroscale" of the fixing element, e.g. for the fixing element in its entirety, and on a "microscale", e.g. for structures on an engagement surface of the profiled element.

The exact structure and the dimensions of the structure on an engagement surface of the profiled element, e.g. the fixing element, may be chosen freely based on the intended application of the profiled element. The skilled person can readily select an appropriate structure based on the characteristics of the bearing element and/or the fastening element. In a specific embodiment the fixing element has different structures on the first and the second engagement surfaces. For example, the fixing element, e.g. a first fixing element, may have a first engagement structured to engage a surface of a bearing element and a second engagement surface structured to engage a complementary engagement surface of a second fixing element, which second element in turn has an engagement surface structured to engage a surface of a fastening element so that the first and the second fixing elements are employed as a pair between the bearing element and the fastening element. When the first and the second fixing element are employed as a pair an improved fixing effect is obtained.

Further aspects of the invention relate to:

An assembly comprising a fixing element according to the invention compressed between a bearing element and a fastening element;

A kit comprising a fixing element of the invention, a bearing element and a fastening element. The fastening element may for example be a nut and the fastening element may be a screw or bolt, wherein the nut and the screw or bolt comprises complementary fastening means, e.g. internal and external helical threads as appropriate;

A kit comprising a fixing element of the invention and a fastening element for fastening to a bearing element having an appropriate complementary fastening means. For example, the fastening element may be a screw with an external helical thread for fastening in a bearing element having a complementary internal helical thread;

A pair of fixing elements of the invention, wherein a first fixing element has an engagement surface complementary to an engagement surface of a second fixing element.

A kit comprising a pair of fixing elements of the invention, a bearing element and a fastening element. The fastening element may for example be a nut and the fastening element may be a screw, wherein the nut and the screw comprise complementary fastening means, e.g. internal and external helical threads as appropriate;

A kit comprising a pair of fixing elements of the invention and a fastening element for fastening to a bearing element having an appropriate complementary fastening means. For example, the fastening element may be a screw with an external helical thread for fastening in a bearing element having a complementary internal helical thread.

In general all variations and features for any aspect and embodiment of the invention may be combined freely. For example, the method of the invention may provide any embodiment of the fixing element of the invention, in particular a fixing element. Likewise, any stainless steel that is relevant for the profiled element is also relevant for the method.

BRIEF DESCRIPTION OF THE FIGURES

In the following the invention will be explained in greater detail with the aid of an example and with reference to the schematic drawings, in which.

DETAILED DESCRIPTION OF THE INVENTION

Figure 1A:
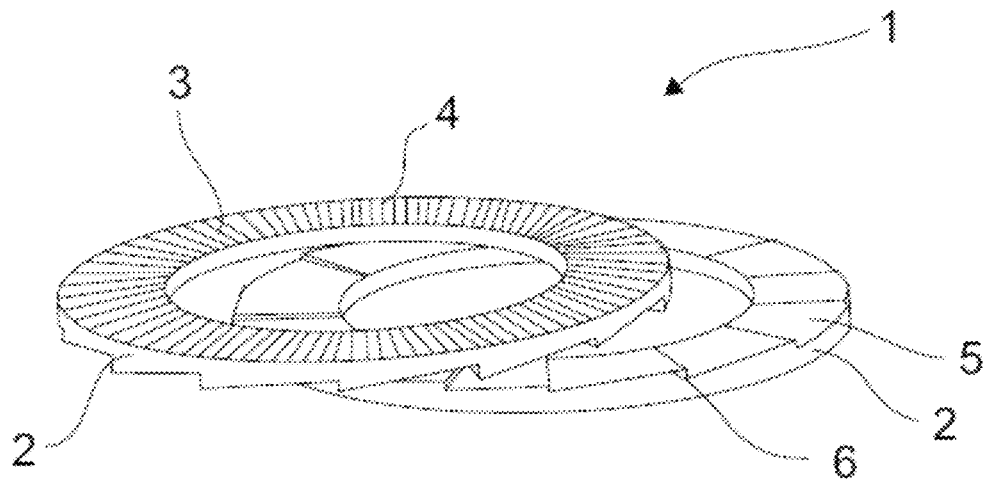
FIG. 1a shows a set of fixing elements of the invention.

The present invention relates to a profiled element suitable for repeated deformation and relaxation, which profiled element is made from a case hardened stainless steel comprising at least 9% chromium and up to 5% nickel, which profiled element has a material thickness in the range of from 0.2 mm to 3 mm and a nitrogen martensitic case with a case depth in the range of from 10 μm to 50 μm and a surface hardness of up to 750 HV0.05 and to a method of case hardening a workpiece made from a stainless steel comprising at least 9% chromium and up to 5% nickel, which workpiece has a material thickness in the range of from 0.2 mm to 3 mm, the method comprising the steps of:
 providing a workpiece punched from a sheet of the stainless steel,
 optionally embossing the workpiece,
 in an atmosphere of a nitrogen containing gas dissolving at least nitrogen in the workpiece at a temperature $T_{high}$, which is higher than the solubility temperature for nitride and lower than the melting point of the stainless steel, wherein dissolution of nitrogen at the temperature $T_{high}$ is performed to obtain a diffusion depth in the range of 10 μm to 50 μm with a content of nitrogen in the range of 0.05% to 0.5%,
 cooling the workpiece after the dissolution step at temperature $T_{high}$ to a temperature $T_{low}$ which is lower than the temperature at which nitrides form in the stainless steel, to provide a nitrogen martensitic case, wherein the cooling is effected within 60 seconds.

The present application employs the following definitions.

The profiled element of the present invention is described in terms of its hardness. In the context of the invention the hardness is generally the HV0.05 as measured according to the DIN EN ISO 6507 standard. If not otherwise mentioned the unit "HV" thus refers to this standard.

The present invention is relevant for stainless steels of specific compositions, and the content of an alloying element in a stainless steel may be referred to as a percentage. In the context of this invention such percentages refer to the chemical composition. Stainless steels and comparable alloys having a chromium content of at least 9%, e.g. at least 10.5%, and containing up to 5% nickel, e.g. up to 4% or up to 3% nickel are especially suitable for the present invention. For example the stainless steel may be nickel free. Preferred stainless steels are ferritic and martensitic stainless steels, e.g. those of the AISI 400-series. Particularly preferred stainless steels are ferritic stainless steels, e.g. AISI 430. Other relevant steel types in the AISI 400-series are 409, 410, 439, 434, 444. Relevant steel types according to the DIN 17007-standard are 1.4600, 1.4512, 1.4003, 1.4000, 1.4589, 1.4016, 1.4511, 1.4520, 1.4510, 1.4509, 1.4113, 1.4513, 1.4521 or 1.4713, 1.4724, 1.4736, 1.4742, 1.4762.

The stainless steel is considered to be a "passive" alloys meaning that it has an oxide layer on the surface. An alloy can be both self-passivating or be passivated as a consequence of a process to which the alloy is subjected. Belonging to the group of self-passivating alloys are those, which have a strong affinity to oxygen (e.g. Cr, Ti, V), including alloys containing such alloying elements (e.g. at least 9% Cr). In general, a chromium content of 9% is required for a steel to be classified as "stainless steel".

In terms of the invention an "alloying element" may refer to a metallic component or element in the alloy, or any constituent in the analysis of the alloy. In particular, alloys of relevance in the method of the invention comprise an element that may form nitrides and/or carbides with present nitrogen and carbon, respectively. The method of the invention advantageously provides a surface free from nitrides and carbides of alloying elements. An alloy may also comprise other elements, such as semi-metallic elements, intermetallic elements, or non-metallic elements. Alloying elements capable of forming nitrides and/or carbides may typically be metallic elements providing corrosion resistance to the alloy due to formation of a passive oxide layer with the alloying element. The terms "nitride" and "carbide" as used in the context of the invention refer to nitrides and carbides formed between alloying elements and nitrogen and carbon, respectively. An exemplary nitride is chromium nitride, CrN or $Cr_2N$ although terms "nitride" and "carbide" are not limited to nitrides and carbides with chromium. Exemplary alloying elements are molybdenum, tungsten, copper, titanium, niobium, zirconium, manganese, silicon, typically present in ranges below 5%, e.g. below 2%.

The method of the invention prevents sensitisation of the stainless steel. By the term "sensitisation" is to be understood that nitrogen or carbon have formed nitrides and carbides, respectively, by reaction with one or more alloying elements otherwise utilised to form the protective oxide layer on the surface, as for example chromium in stainless steel. When sensitisation occurs, the free content of the alloying element, such as chromium, in solid solution is lowered to a level, which is no longer sufficient to maintain a complete protective oxide layer, which means that the corrosion characteristics are deteriorated.

By the term "solubility temperature for nitride" is to be understood the temperature at which nitrides are not stable, and where already formed nitrides are dissolved. There is likewise also a "solubility temperature for carbide", which is the temperature at which carbides are not stable, and where already formed carbides are dissolved. In general, alloys comprising metallic alloying elements capable of forming nitrides and/or carbides will have a temperature interval in which nitrides and/or carbides may form when nitrogen and carbon, respectively, are present. Thus, above this temperature interval, nitrides and carbides will not form, and already formed nitrides/carbides are dissolved. When nitrides or carbides exist, i.e. sensitisation has occurred, these nitrides or carbides can generally only be removed by exposing the sensitised metal to a temperature above the austenisation temperature. Furthermore, such alloys have a temperature below the temperature interval, where nitrides and carbides will not form, although nitrides or carbides already formed in an alloy cannot be removed at the low temperature.

The method of the invention comprises steps of dissolving at least nitrogen in the stainless steel, but in certain embodiments carbon may also be dissolved. The step of dissolving nitrogen may also be referred to as the "dissolution of nitrogen" or "nitriding", and likewise step of dissolving carbon may also be referred to as the "dissolution of carbon" or "carburising". When both nitrogen and carbon are dissolved in the same process step may be referred to as "nitrocarburising".

Figure 1B:
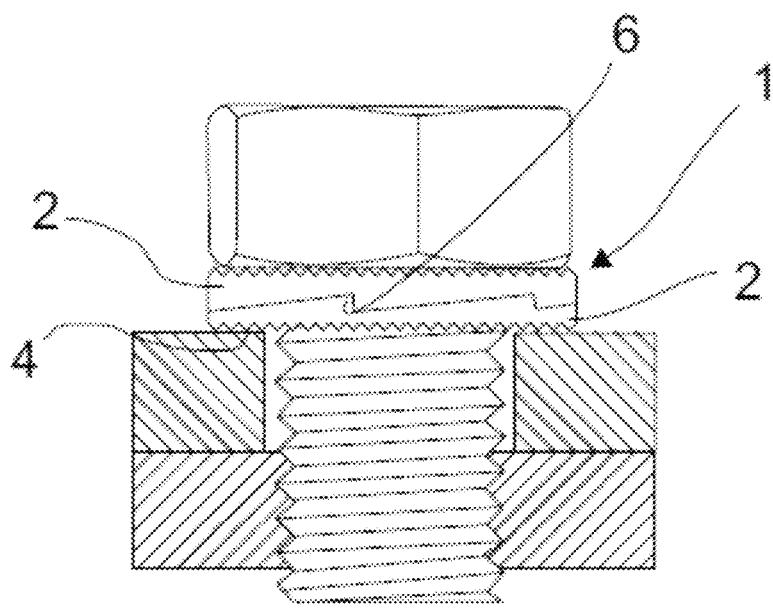
FIG. 1b shows a set of fixing elements of the invention inserted between a bolt and nut.

FIG. 1 shows a set of fixing elements of the present invention (FIG. 1a) and the set of fixing elements inserted between a fastening element and a bearing element (FIG. 1b) in the form of a bolt and a nut, respectively. In the embodiment shown in FIG. 1 the fixing element, e.g. "lockwasher", set 1 comprises two fixing elements 2 and illustrates the use of these. Each washer 2 has a first engagement surface 3 with radial teeth 4 and an opposite second engagement surface, a "camside", 5 with cams 6. During use of the fixing element set 1 the fixing elements 2 are placed as shown with the camsides 5 facing each other. The lockwashers are used in pairs mounted with the cams against each other to obtain a key lock effect. They are especially suitable to effectively lock bolt assemblies which are exposed to extreme vibrations or dynamic loads and to corrosive environment, such as salt water. There are therefore strong requirements to the strength and corrosion resistance of these washers.

In another embodiment (not shown) the fixing element has two identical engagement surfaces, e.g. with teeth or cams, or with no protrusions, and the fixing element is used alone without a second fixing element.

A further exemplary fixing element is described in US 2013/0243544 A1, the contents of which are hereby incorporated by reference. An example of particular relevance to the present invention is depicted in FIGS. 1 to 4 of US 2013/0243544 A1, together with the accompanying text, e.g. paragraphs [0024]-[0027] and [0028]-[0038] which are hereby incorporated by reference.

Figure 2A:
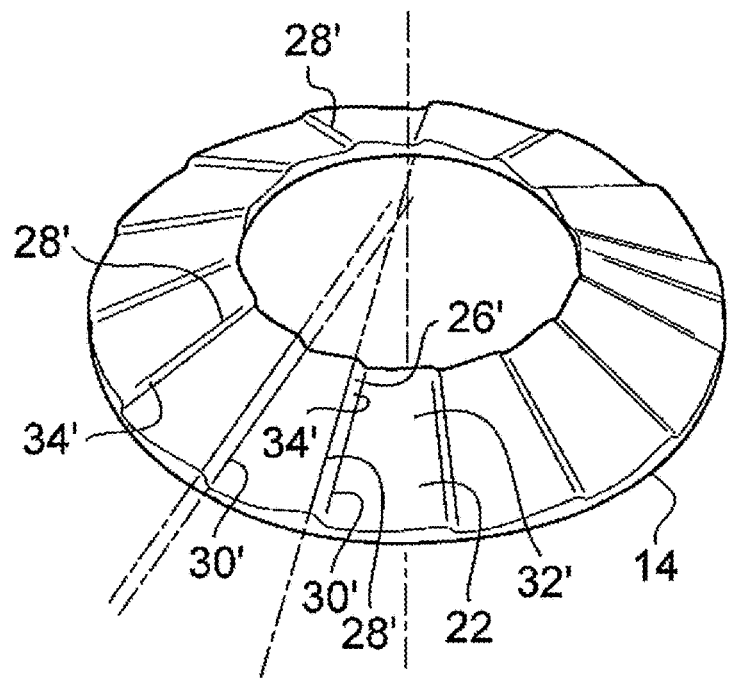
FIGS. 2a and b show schematic perspective views of two fixing elements of the invention for use as a set of fixing elements.
Figure 2B:
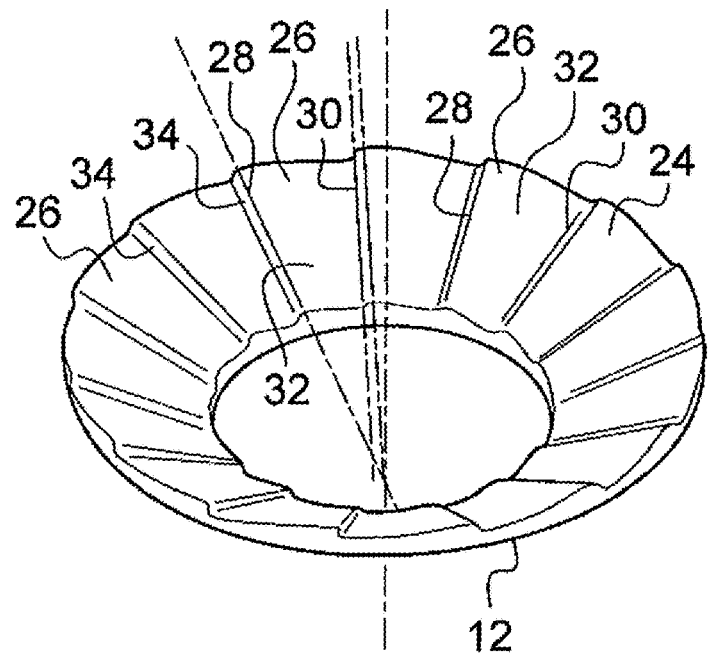

Yet a further embodiment of the present invention is illustrated in FIG. 2, where a first frustoconical fixing element as shown in FIG. 2a has an internal washer crown 14 corresponding to a first engagement surface of a first fixing element; the figure shows the fixing element in a perspective view, seen from above. In FIG. 2b the complementary engagement surface to the first engagement surface of the first fixing element, the external washer crown 12, of a second frustoconical fixing element appears in a view seen from below. The external washer crown 12 defines a first middle cone, while the internal washer crown 14 defines a second middle cone. The internal washer crown 14 has a convex engagement surface 22, while the external washer crown 12 has a concave engagement surface 24. The two engagement surfaces 22, 24 are complementary and are adapted for engagement with each other, e.g. without leaving any free space between the two crowns 14, 12. When the two fixing elements of FIG. 2 are inserted between a fastening element and a bearing element they can be elastically deformed in an axial direction, between a conical state and a flattened state; see e.g. FIG. 1b. A lubricant may be applied onto the engagement surfaces 22, 24 to facilitate the movement of the sliding sides 32, 32' against each other.

Regarding the concave engagement surface 24 of the external washer crown 12 shown in FIG. 2b, it has 15 first asymmetrical radial teeth 26 distributed regularly in the circumference of the washer crown 12. Each of these first asymmetrical radial teeth 26 has a first crest 28 that extends radially and a first tooth bottom 30 separated angularly, substantially by 24°, from the first crest 28, and which also extends radially. Each of the first asymmetrical radial teeth 26 thus has, on the one hand, a first sliding side 32 which extends angularly in an inclined manner between the first crest 28 and the first tooth bottom 30. The first sliding side 32 of each of the first asymmetrical radial teeth 26 intersects the first middle cone defined above, while forming an angle of some degrees relative to the level of the section line, e.g. 5°. The first asymmetrical radial teeth 26 have, on the other hand, a first stop side 34 that extends opposite to the first sliding side 32 relative to the first crest 28 and which joins the first tooth bottom 30 of the following first asymmetrical radial tooth 26. In turn, the first stop side 34 intersects the first middle cone while forming a neighbouring angle of e.g. 90°, 95° plus or minus 10°, relative to the level of the section line. Also, the first stop side 34 extends angularly between the first crest 28 and the first tooth bottom 30 of the following first asymmetrical radial tooth 26, according to the first middle cone defined above, at some degrees only, e.g. two degrees.

Now reference is made to FIG. 2a, wherein the convex engagement surface 22 of the internal washer crown 14 has a shape which is complementary to the shape of the concave engagement surface 24 of the external washer crown 12. Also, its analogue elements are indicated by the same reference provided with the prime symbol '. Thus, it has 15 second asymmetrical radial teeth 26' having the same profile as the first asymmetrical radial teeth 26, and distributed along the circumference. Each of the second teeth 26' has a second crest 28' which extends radially and a second tooth bottom 30' separated angularly by approximately 24° from the second crest 28'. Also each of the second asymmetrical radial teeth 26' has, on the one hand, a second sliding side 32' which extends angularly in an inclined manner between the second crest 28' and the second tooth bottom 30'. This second sliding side 32' of each of the second asymmetrical radial teeth 26' intersects the second middle cone defined above while forming an angle of some degrees relative to the level of the section line, e.g. 5°. The second asymmetrical radial teeth 26' have, on the other hand, a second stop side 34' which extends opposite the second sliding side 32' relative to the second crest 28' and which joins the second tooth bottom 30' of the following second asymmetrical radial tooth 26'. In turn, the second stop side 34' intersects the second middle cone while forming a neighbouring angle of 90° relative to the level of the section line. Also, the second stop side 34' extends angularly between the second crest 28 ' and the second tooth bottom 30' of the following second asymmetrical radial tooth 26', in accordance with the second middle cone defined above, at some degrees only, e.g. 2 degrees.

Following connection of the external washer crown 12 and the internal washer crown 14, the convex engagement surface 22 against the concave engagement surface 24, and following engagement of the locking washer thus formed between a fastening element, e.g. a screwable element, and a bearing element, the rotation of the screwable element brings about the axial deformation in phase of the two crowns 12, 14, while they are rotatably locked relative to each other due to the stop sides 34, 34' of the teeth being in abutment on each other, respectively. In this manner, the teeth 26, 26' of the two crowns 12, 14 stay engaged during the deformation. Also, the teeth 26, 26' are not damaged during the deformation to flat state of the locking washer. The present invention provides that the fixing element can be reused after more than 5, e.g. more than 10, cycles of deformation and release from deformation between the fastening element and the bearing element.

The set of frustoconical fixing elements described above and illustrated in FIG. 2 may be varied as desired with respect to the number of teeth, ridges etc. and the present invention is not limited with respect to the number of radial teeth or the like. The method of the invention is illustrated in the following example.

EXAMPLES

Example 1

Figure 3A:
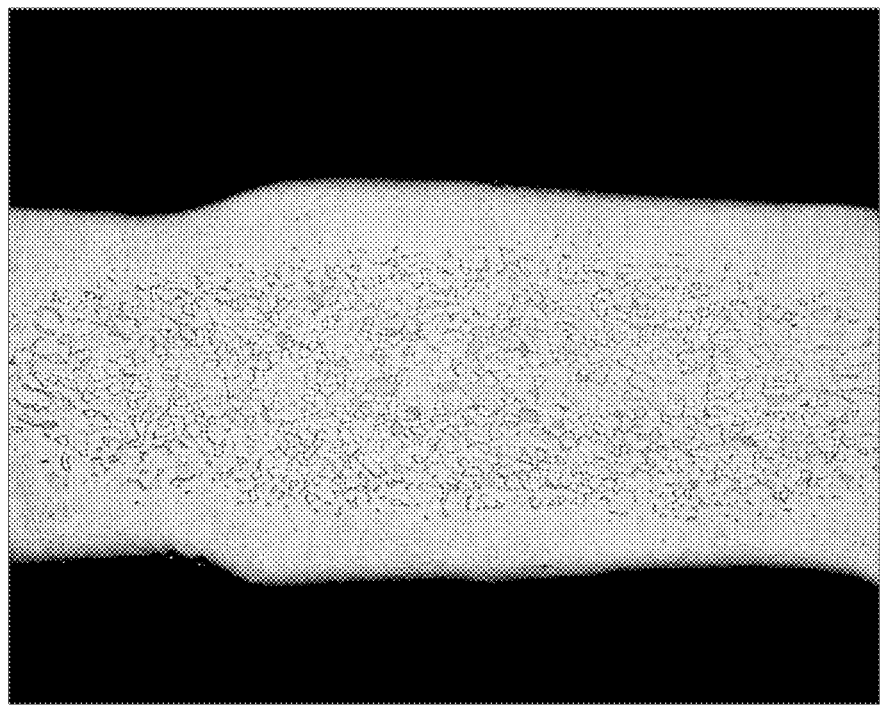
FIG. 3a shows a photomicrograph of the cross-section of a workpiece provided with a nitrogen martensitic case.
Figure 3B:
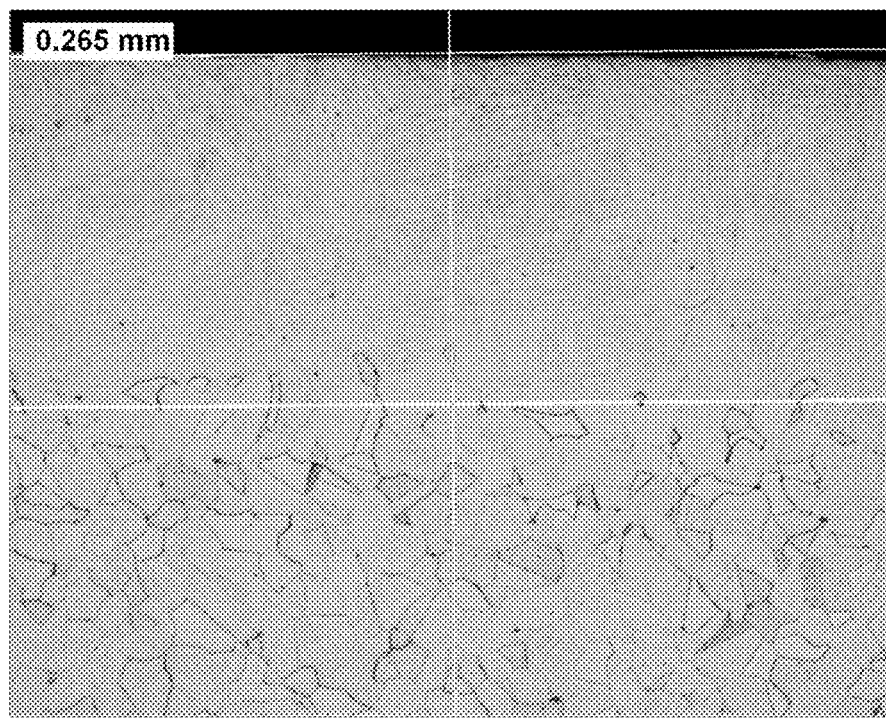
FIG. 3b shows a detail of a photomicrograph of the cross-section of a workpiece provided with a nitrogen martensitic case.
Figure 4A:
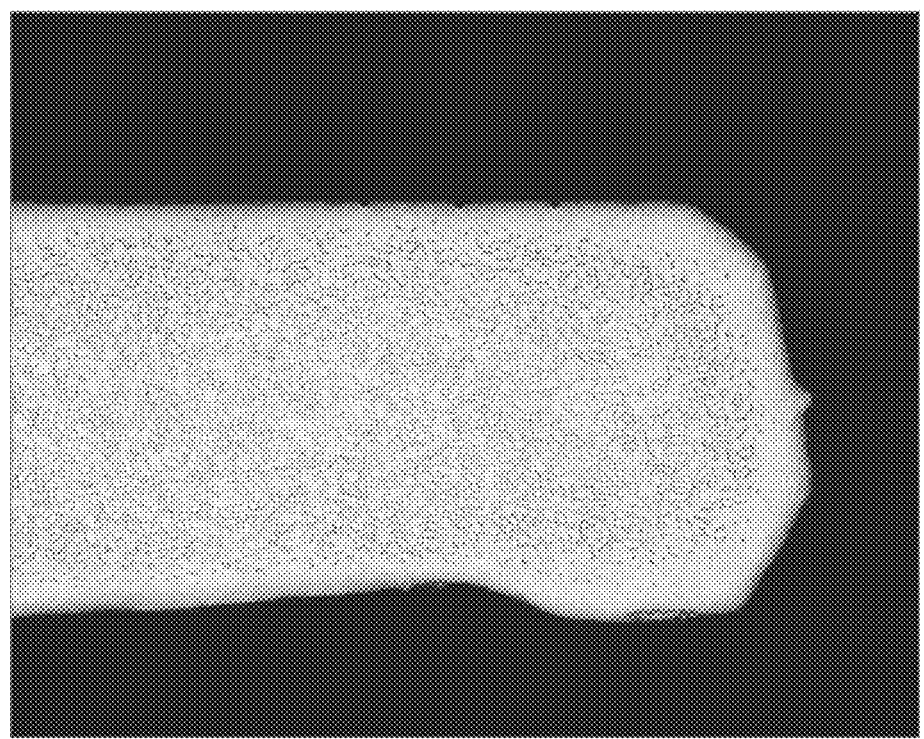
FIG. 4a shows a photomicrograph of the cross-section of a workpiece provided with a nitrogen martensitic case.
Figure 4B:
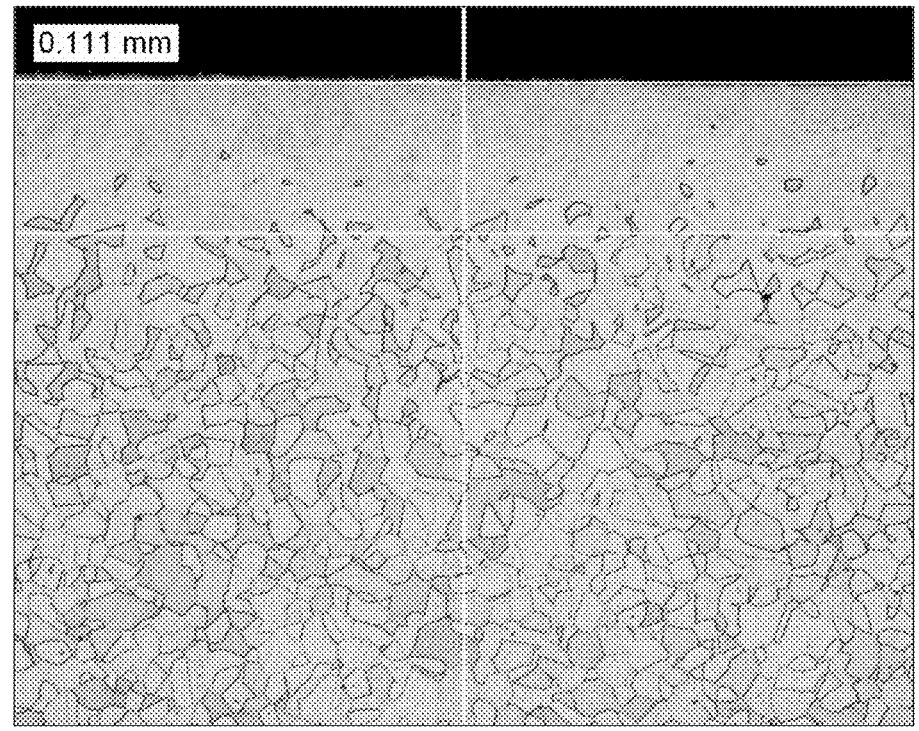
FIG. 4b shows a detail of a photomicrograph of the cross-section of a workpiece provided with a nitrogen martensitic case.

Workpieces were punched from a sheet of AISI 430 stainless steel of a thickness of 1 mm and treated to dissolve nitrogen to depths of 265 µm, 111 µm and 175 µm to nitrogen contents in the range of 0.2% to 0.4%. Nitrogen dissolution was performed at temperatures above 1050° C. and subsequently the workpieces were cooled to room temperature in less than 60 seconds using nitrogen gas. The cross-sections of the treated workpieces were polished and analysed using optical microscopy. FIG. 3a shows the cross-section of the workpiece treated to a depth of 265 µm; the workpiece had a thickness of 1.5 mm and as evident from FIG. 3a the workpiece had a well-defined nitrogen martensitic case, of 265 µm thickness, as shown in FIG. 3b. Likewise, a workpiece of 1 mm thickness was treated to insert nitrogen to a depth of 111 µm, and this workpiece also had a well-defined nitrogen martensitic case (FIG. 4a), of a thickness of 111 µm (FIG. 4b).

Figure 5A:
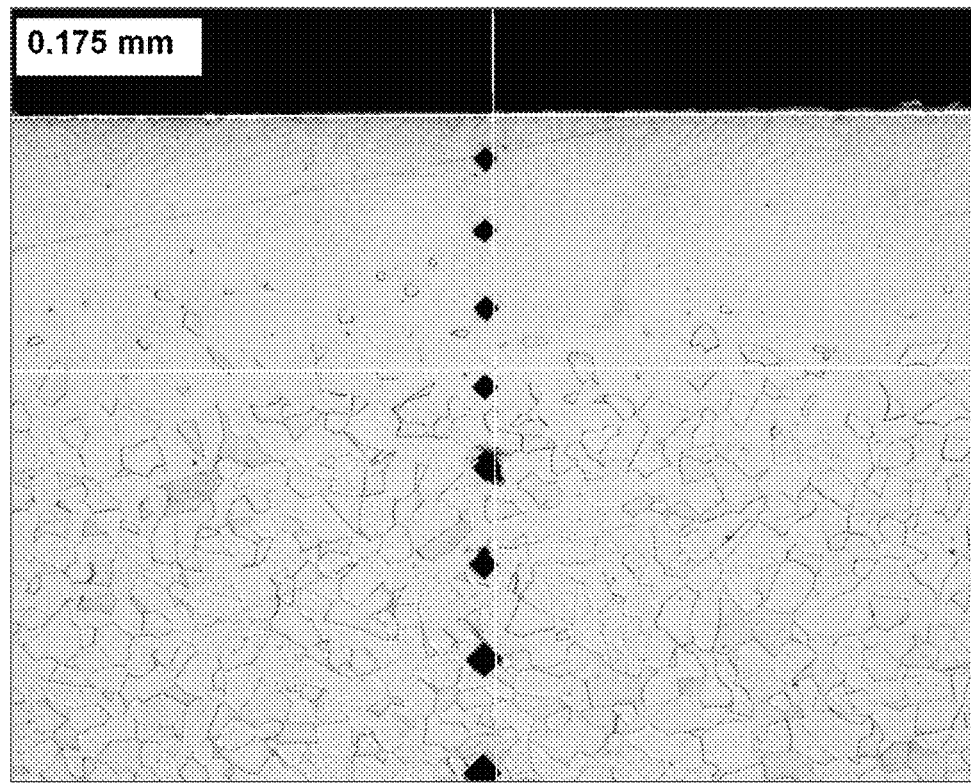
FIG. 5a shows a detail of a photomicrograph of the cross-section of a workpiece provided with a nitrogen martensitic case.
Figure 5B:
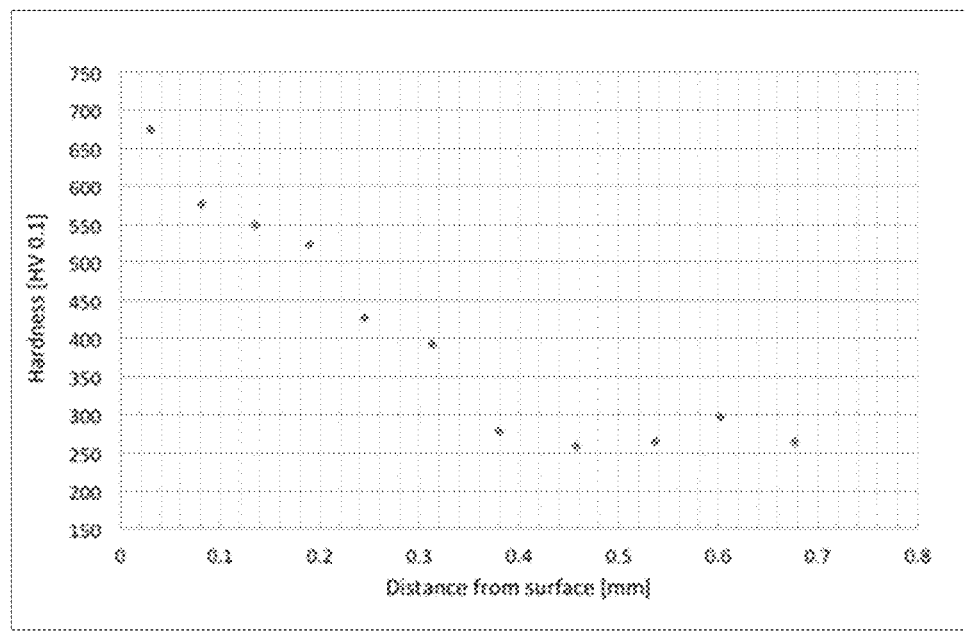
FIG. 5b shows a hardness profile of a workpiece provided with a nitrogen martensitic case.

The workpiece treated to dissolve nitrogen to a depth of 175 µm had a thickness of 1.5 mm, and as illustrated in FIG. 5a the workpiece had a well-defined nitrogen martensitic case. This workpiece was further analysed for the hardness profile over the cross-section. As seen from FIG. 5b the superficial hardness was about 650 HV, and the core hardness was about 275 HV.

While neither of these workpieces was suitable for repeated deformation and relaxation, the experiments document that well-defined nitrogen martensitic cases could be formed in a nickel free stainless steel when treated as described above, i.e. no cryogenic treatment was necessary.

Example 2

A workpiece was punched from a sheet of AISI 430 stainless steel of a thickness of 1 mm to have an annular shape. The workpiece was subsequently embossed to provide the workpiece with protrusions to provide the first and the second engagement surfaces of a fixing element. The embossed workpiece was treated according to the method of the invention where nitrogen was dissolved from an essentially pure nitrogen atmosphere under the conditions shown in Table 4. The prepared fixing elements were test for reusability by fastening the fixing element by screwing between a bolt and nut before releasing the fixing element from the deformation and repeating the fastening. The corrosion resistance of the fixing elements was also examined according the ISO 9227 saltspray test. Results from the reusability and the saltspray test are shown in Table 4.

Where a value in Table 4 is indicated as "-" this means the corresponding property has not been analysed.

TABLE 4

Reusability and corrosion resistance

| $P_{nitrogen}$ (mbar) | $T_{high}$ (° C.) | Time (min) | Case depth (µm) | Surface hardness (HV) | Reusability (times) | Saltspray test (hours) |
|---|---|---|---|---|---|---|
| 1200 | 1100 | 60 | 248 | 510 | 0 | — |
| 500 | 1100 | 60 | 173 | 620 | 0 | — |
| 100 | 1100 | 60 | 34 | 590 | — | — |
| 300 | 1100 | 30 | 19 | — | — | <20 |
| 100 | 1100 | 30 | 10 | — | — | — |
| 200 | 1100 | 60 | 13 | 644 | >10 | <20 |
| 200 | 1100 | 90 | 21 | 670 | >5 | <20 |
| 150 | 1150 | 60 | 20 | 630 | >10 | >223 |
| 300 | 1150 | 60 | 50 | 670 | >5 | >168 |
| 300 | 1100 | 120 | 143 | 579 | 0 | — |
| 900 | 1150 | 60 | 321 | — | 0 | — |
| 1500 | 1150 | 60 | 338 | 670 | 0 | — |
| 500 | 1150 | 120 | 265 | 627 | 0 | — |
| 100 | 1150 | 60 | 10 | 622 | >10 | >333 |
| 500 | 1150 | 60 | 180 | 635 | 0 | — |
| 200 | 1150 | 30 | 15 | 621 | — | >184 |

Surprisingly it was found that the native low core hardness (220 HV) of the ferritic stainless steel combined with a martensitic hard case of 10-50 µm and a surface hardness of up to 680 HV are sufficient to avoid deformation of cams and teeth. Consequently, the washers reached a reusability exceeding 5 times, or 10 times for certain combinations of parameters, while still having a locking effect.

Example 3

Figure 6:
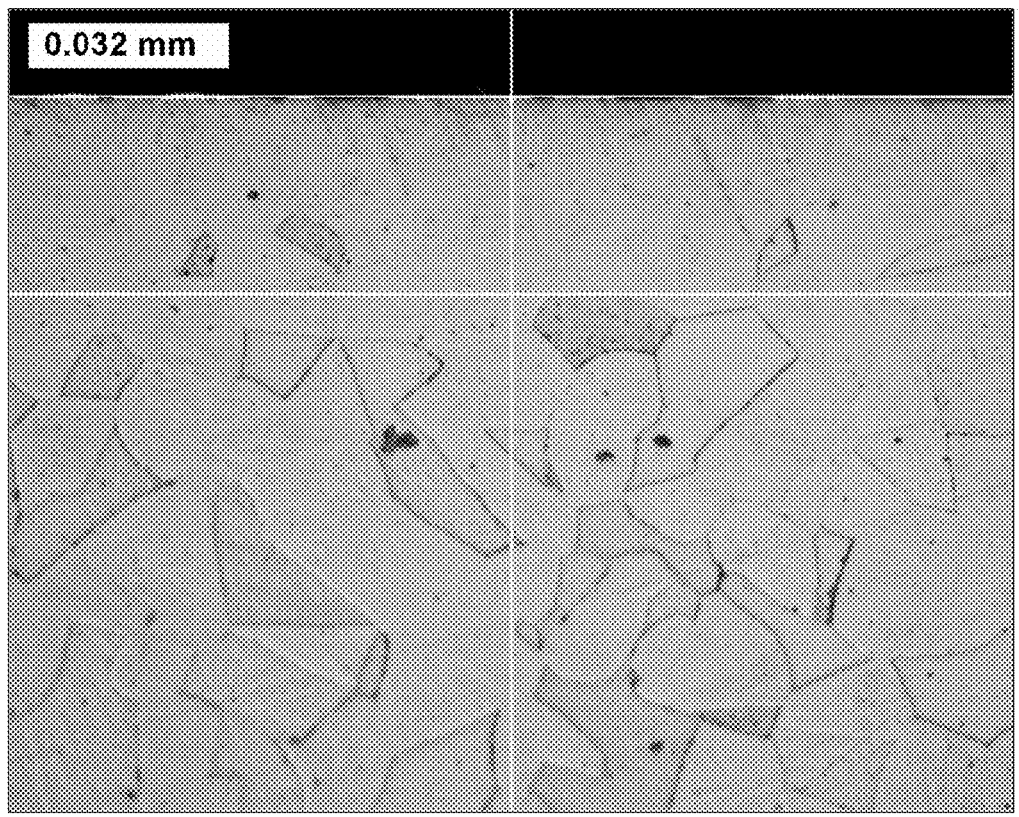
FIG. 6 shows a photomicrograph of the cross-section of a profiled element of the invention.

A workpiece of a ferritic stainless steel of a thickness of 1 mm was treated according to the invention to have a nitrogen content of about 0.3% to provide a nitrogen martensitic case of 32 µm. The cross-section of the treated workpiece was polished and analysed using optical microscopy. FIG. 6 shows the cross-section of the workpiece, which illustrates the well-defined nitrogen martensitic case.

Example 4

Lockwashers as illustrated in FIG. 1a representing a fixing element of the invention were treated in the method according to the invention. The lockwasher 2 may be used together with an identical lockwasher in a set 1 as illustrated, and the lockwasher 2 had a first side 3 with radial teeth 4 and an opposite camside 5 with cams 6. During use of the lockwashers 2 in the set 1 may be placed as shown with the camsides 5 facing each other.

Figure 7A:
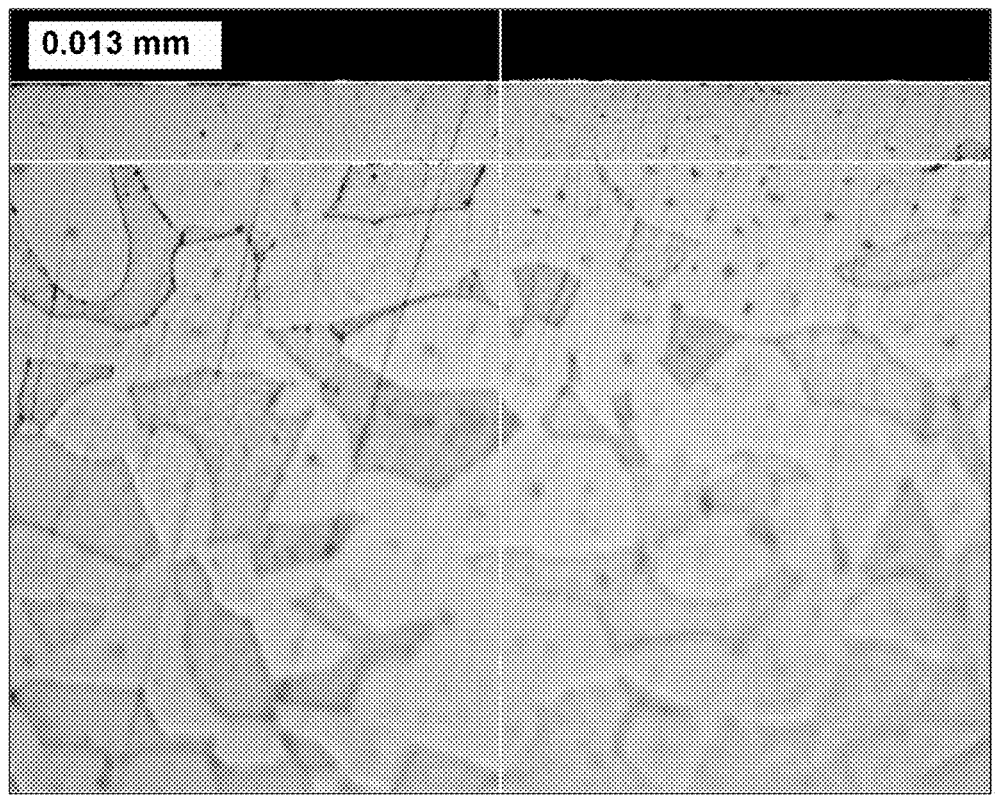
FIG. 7a shows a photomicrograph of the cross-section of a lockwasher of the invention.

The lockwashers (AISI 430 stainless steel of a thickness of 1.5 mm) were treated for 90 min at 1100° C. in a nitrogen pressure of 200 mbar before cooling to room temperature in argon over a period of 60 seconds. The lockwasher had a nitrogen martensitic case of 13 µm and a surface hardness of 650 HV. The cross-section of a lockwasher is illustrated in FIG. 7a.

The lockwashers were tested for reusability by pairing together and repeated fixing between and release from a bolt and a nut. The reusability test revealed that the lockwasher could be used in more than 10 cycles of deformation and release.

Figure 7B:
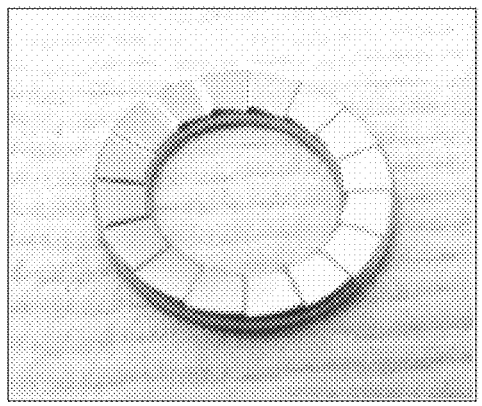
FIG. 7b shows a photo of a lockwasher of the invention.

The lock washer was further analysed for corrosion resistance according the ISO 9227 saltspray test. After 168 hours of saltspray test the lockwasher did not show any signs of being corroded as evident from FIG. 7b.

The invention claimed is:

1. A profiled element suitable for repeated deformation and relaxation, which profiled element is made from a case hardened sheet of a ferritic stainless steel comprising at least 9% (w/w) chromium and up to 5% (w/w) nickel, which profiled element has a material thickness in the range of from 0.2 mm to 3 mm and a nitrogen martensitic case with a case depth in the range of from 10 µm to 50 µm and a nitrogen content in the range of 0.05% (w/w) to 0.5% (w/w), and which profiled element has a surface hardness of up to 750 HV0.05.

2. The profiled element according to claim 1, wherein the nitrogen martensitic case does not comprise more than 5% retained austenite.

3. The profiled element according to claim 1, wherein the surface hardness is at least 620 HV.

4. The profiled element according to claim 1, wherein the profiled element is a fixing element having an annular, frustoconical or helical shape.

5. The profiled element according to claim 1, wherein the profiled element is a fixing element having a first engagement surface and a second engagement surface, which first engagement surface and/or which second engagement surface is structured.

6. The profiled element according to claim 5, wherein the structured surface comprises protrusions with perpendicular dimensions, relative to the engagement surface of the profiled element in the range of from 100 µm to 1 mm or more.

7. The profiled element according to claim 1, wherein the ferritic stainless steel is selected from the list consisting of 1.4600, 1.4512, 1.4003, 1.4000, 1.4589, 1.4016, 1.4511, 1.4520, 1.4510, 1.4509, 1.4113, 1.4513, 1.4521, 1.4713, 1.4724, 1.4736, 1.4742, and 1.4762 according to the DIN 17007-standard.

8. A profiled element according to claim 1, wherein the profiled element is selected from the group consisting of a fixing element, a spring, a clip for holding paper, or a hair pin.

9. A pair of profiled elements according to claim 5, wherein the profiled elements are fixing elements, and wherein a first fixing element has an engagement surface complementary to an engagement surface of a second fixing element.

10. An assembly comprising a fixing element or a pair of fixing elements suitable for repeated deformation and relaxation, which fixing element or which pair of fixing elements is made from a case hardened sheet of ferritic stainless steel comprising at least 9% (w/w) chromium and up to 5% (w/w) nickel, which fixing element or which pair of fixing elements has a material thickness in the range of from 0.2 mm to 3 mm and a nitrogen martensitic case with a case depth in the range of from 10 µm to 50 µm and a nitrogen content in the range of 0.05% (w/w) to 0.5% (w/w), and which fixing element or which pair of fixing elements has a surface hardness of up to 750 HV0.05, the pair of fixing elements comprising a first fixing element having an engagement surface complementary to an engagement surface of a second fixing element, the fixing element or the pair of fixing element being compressed between a bearing element and a fastening element.

11. An assembly according to claim 10, wherein the fastening element is a screw with an external helical thread for fastening in the bearing element having a complementary internal helical thread.

12. A kit comprising a fixing element or a pair of fixing elements suitable for repeated deformation and relaxation, which fixing element or which pair of fixing elements is made from a case hardened sheet of ferritic stainless steel comprising at least 9% (w/w) chromium and up to 5% (w/w) nickel, which fixing element or which pair of fixing elements has a material thickness in the range of from 0.2 mm to 3 mm and a nitrogen martensitic case with a case depth in the range of from 10 µm to 50 µm and a nitrogen content in the range of 0.05% (w/w) to 0.5% (w/w), and which fixing element or which pair of fixing elements has a surface hardness of up to 750 HV0.05, a bearing element and a fastening element.

13. A kit according to claim 12, wherein the fastening element is a screw with an external helical thread for fastening in the bearing element having a complementary internal helical thread.

* * * * *